United States Patent
Davidson et al.

(10) Patent No.: US 11,797,579 B2
(45) Date of Patent: Oct. 24, 2023

(54) DATA CONTENT GOVERNANCE FOR PRESENTATION LAYER SYNCHRONIZATION FOR A VERSION CONTROLLED UNDERLYING DATA MODEL

(71) Applicant: Google LLC, Mountain View, CA (US)

(72) Inventors: Jamie Davidson, Mountain View, CA (US); Colin Zima, San Francisco, CA (US); Jonathan Swenson, Santa Cruz, CA (US); Lloyd Tabb, Santa Cruz, CA (US); Ben Porterfield, Santa Cruz, CA (US); Steven Talbot, Santa Cruz, CA (US); Conrad Slimmer, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 361 days.

(21) Appl. No.: 16/730,950

(22) Filed: Dec. 30, 2019

(65) Prior Publication Data

US 2021/0200791 A1    Jul. 1, 2021

(51) Int. Cl.
*G06F 16/28* (2019.01)
*G06F 16/25* (2019.01)
*G06F 3/04847* (2022.01)

(52) U.S. Cl.
CPC ........ *G06F 16/287* (2019.01); *G06F 3/04847* (2013.01); *G06F 16/252* (2019.01)

(58) Field of Classification Search
CPC ... G06F 16/287; G06F 3/04847; G06F 16/252
See application file for complete search history.

(56) References Cited

U.S. PATENT DOCUMENTS 5,619,631 A * 4/1997 Schott .................. G06F 40/177
                                                    345/440
9,489,119 B1 * 11/2016 Smith, Jr. ............ G06F 40/117
(Continued)

OTHER PUBLICATIONS

International Search Report, Application No. PCT/US2020/067386, dated Apr. 22, 2021, 13 pages.

*Primary Examiner* — Apu M Mofiz
*Assistant Examiner* — J Mitchell Curran
(74) *Attorney, Agent, or Firm* — Honigman LLP; Brett A. Krueger

(57) ABSTRACT

Data content governance for presentation layer synchronization for a version controlled underlying data model includes defining a data model for underlying data in a database, specifying a presentation layer for the defined data model and identifying selected elements of the data model necessary to meet data requirements of the specified presentation layer. Then, the identified selected elements of the data model are serialized and both the specified presentation layer and the serialized elements are versioned in respect to the specified presentation layer. Thereafter, when the data model becomes modified, the specified presentation layer is modified to accommodate the modified data model. In response to the modification, a different selection of elements of the data model necessary to meet data requirements of the modified presentation layer are re-identified and serialized, with the modified presentation layer and the serialized re-identified different selection of elements becoming re-versioned.

13 Claims, 2 Drawing Sheets

(56) References Cited

U.S. PATENT DOCUMENTS

| | | | |
|---|---|---|---|
| 2005/0246690 A1* | 11/2005 | Horton | G06F 11/3664 |
| | | | 717/125 |
| 2007/0011653 A1 | 1/2007 | Fischer et al. | |
| 2015/0074044 A1* | 3/2015 | Metreveli | G06F 16/2343 |
| | | | 707/609 |
| 2016/0019244 A1 | 1/2016 | Liu et al. | |
| 2016/0378733 A1* | 12/2016 | Mullins | G06F 40/197 |
| | | | 715/255 |
| 2017/0039253 A1* | 2/2017 | Bond | G06F 16/2474 |
| 2017/0109003 A1 | 4/2017 | Angermayer et al. | |
| 2020/0004847 A1* | 1/2020 | Bagga | H04L 67/567 |
| 2020/0341903 A1* | 10/2020 | Dobiesz | G06F 16/252 |
| 2021/0056104 A1* | 2/2021 | Tong | G06F 16/24534 |

\* cited by examiner

DATA CONTENT GOVERNANCE FOR PRESENTATION LAYER SYNCHRONIZATION FOR A VERSION CONTROLLED UNDERLYING DATA MODEL

BACKGROUND OF THE INVENTION

Field of the Invention

The present invention relates to the field of presentation layer management and more particularly to presentation layer composition based upon an underlying data model.

Description of the Related Art

The term database refers to an organized collection of data, stored and accessed electronically by way of a computing system. A database management system (DBMS) in turn is a computer program that provides an interface between the database and one or more end users so as to facilitate the interaction by each end user with the database. A DBMS generally also provides an interface to other computer programs to access the data in the underlying database. Generally, speaking, end users and other computer programs interact with the database through the DBMS using query directives formed in conformance with a corresponding query language such as the venerable structured query language (SQL).

While the very basic use of SQL to query and manage data in a database is of no great difficulty for many end users, formulating more complex SQL queries is not for the faint of heart. More importantly, specifying a query irrespective of the mechanics of the actual query requires a strong understanding of the data in the database and the underlying relationships between the data. To the extent that "reading" the content of a database is not practical, it is known to model a database so that the created database model can then be introspected so as to afford a deeper understanding of the data in the database. Indeed, modern data analytics tools permit not only the modeling of an existing database, but also the formulation of SQL queries to be executed against the database based upon knowledge only supplied by the model.

In this regard, a data model is an abstract model that describes how a data set of a database is organized, and guides the construction of queries with respect to the data of the data set. The data model generally contains a join graph whose vertices each reference a table and whose edges reflect join conditions between references to the tables. As well, the join graph may also describe the columns in those tables, columns that are derived from other columns via expressions, collections of columns by which queries are typically sorted, collections of columns by which queries are typically grouped into sub-totals and totals, expressions that are derived by combining column values during the construction of a sub-total or total, and other suggestions for how queries might be formed on the data.

Despite the robust nature of a data model, the introspection of a data model for a database, however, is not alone sufficient to enjoy a complete understanding of the data in a database. To that end, a presentation layer applied to data elements of the data model permit a fuller understanding of the nature of the underlying values in a database modeled by the data model. Of course, the presentation layer once generated and rendered, remains fully dependent upon the state of the data model. In particular, some aspects of the data model, once visualization in the presentation layer, depend upon data elements present in the data model, and more importantly, upon values derived from one or more data elements when combined as an aggregation, or derived from a dependency of one data element upon the other. Hence, the validity of the presentation layer can change responsive to a change in the underlying data model rendering the visualization in the presentation layer invalid and forcing the end user to re-specify the presentation layer.

BRIEF SUMMARY OF THE INVENTION

Embodiments of the present invention address deficiencies of the art in respect to presentation layer management, including a visualization or dashboard for an underlying data model, and provide a novel and non-obvious method, system and computer program product for data content governance for presentation layer synchronization for a version controlled underlying data model. In an embodiment of the invention, a data content governance for presentation layer synchronization method includes defining a data model for underlying data in a database, specifying a presentation layer for the defined data model and identifying selected elements of the data model necessary to meet data requirements of the specified presentation layer. The method additionally includes serializing the identified selected elements of the data model and versioning both the specified presentation layer and the serialized elements of the data model in respect to the specified presentation layer. Thereafter, the method includes modifying the data model and also modifying the specified presentation layer to accommodate the modified data model and in response to the modification, re-identifying a different selection of elements of the data model necessary to meet data requirements of the modified presentation layer, serializing the re-identified different selection of elements of the data model and versioning the modified presentation layer and the serialized re-identified different selection of elements.

In one aspect of the embodiment, the method further includes selecting a data model for visualization in a new presentation layer and validating the new presentation layer against the selected data model by comparing a serialization of elements of the selected data model, identified as being necessary to meet data requirements of the new presentation layer, to a versioned form of the new presentation layer. In another aspect of the embodiment, the method further includes responding to a failed validation by selecting a prior version of the data model for visualization in the new presentation layer.

In yet another aspect of the embodiment, the data requirements of the specified presentation layer are user interface controls each referencing a particular element of the data model such that the particular element must be accessible to the specified presentation layer in order to include data of the particular element in a corresponding one of the user interface controls of the specified presentation layer. In even yet another aspect of the embodiment, the data requirements of the specified presentation layer are user interface controls each referencing content that is dependent upon particular element of the data model such that the particular element must be accessible to the specified presentation layer in order to compute data for the referenced content properly for inclusion in a corresponding one of the user interface controls of the specified presentation layer.

In another embodiment of the invention, a data visualization data processing system configured for data content governance for presentation layer synchronization is provided. The system includes a host computing system of one or more computers, each with memory and at least one processor. The system also includes a data visualization module. The module includes comprising computer program instructions executing in the memory of the host computing system and accessing a data model in a database. The program instructions during execution define a data model for underlying data in the database, specify a presentation layer for the defined data model and identify selected elements of the data model necessary to meet data requirements of the specified presentation layer. The program instructions during execution further serialize the identified selected elements of the data model and version both the specified presentation layer and the serialized elements of the data model in respect to the specified presentation layer.

Subsequently the program instructions modify the data model and also the specified presentation layer to accommodate the modified data model respond to the modification by re-identifying a different selection of elements of the data model necessary to meet data requirements of the modified presentation layer, serializing the re-identified different selection of elements of the data model and versioning the modified presentation layer and the serialized re-identified different selection of elements.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for data content governance for presentation layer synchronization. In accordance with an embodiment of the invention, a data model is selected for a database including a multiplicity of different model elements. A presentation layer is then defined for visualizing values associated with the different model elements, such as a graphical visualization of underlying values in the database corresponding to the different model elements, or values reflecting an aggregation of different underlying values in the database corresponding to the different model elements, or values derived from underlying values of dependent ones of the model elements. An association is then established as between the visualization and the different model elements necessary for rendering the visualization as a serialization of the required model elements and a versioning of both the serialization and the visualization. Consequently, as the database model changes, when a visualization is selected in connection with the changed model in respect to a set of data elements in the model, the set of data elements can be serialized and compared to the versioned serialization corresponding to the selected visualization so as to detect a match. Without a match, it can be presumed that the set of data elements is lacking in respect to the association and, in consequence, a prior version of the data model can be selected from which the presentation can be rendered.

Figure 1:
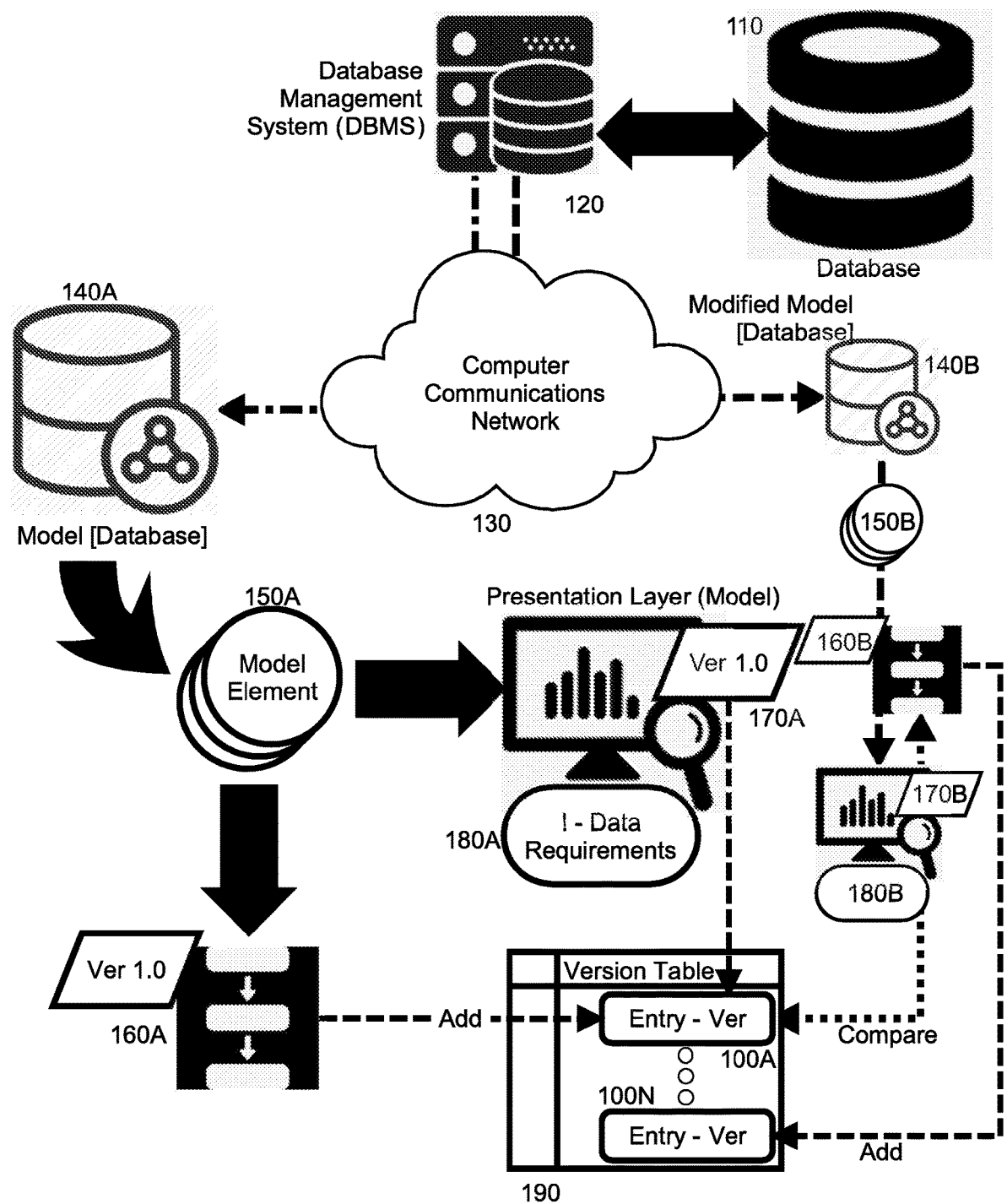
FIG. 1 is a pictorial illustration of a data content governance for presentation layer synchronization process.

In further illustration, FIG. 1 is a pictorial illustration of a data content governance for presentation layer synchronization process. As shown in FIG. 1, a data model 140 is defined for a database 110 by operation of a database management system 120 from over a computer communications network 130. A presentation layer 170A is then defined to include a visualization visualizing values from the database 110 in association with a set of different model elements 150A in the database model 140A. The presentation layer 170A includes data requirements 180A for the model elements in the set 150A. In this regard, the visualization visualizes values mapped from a specific field in the database 110 associated with a corresponding one of the model elements in the set 150A, or the visualization visualizes values derived from an associated model element in the set 150A, or the visualization visualizes values produced from an aggregation of associated model elements in the set 150A, or the visualization visualizes values mapped from a specific field in the database 110 dependent upon another field in the database 110 both associate with respective elements in the set 150A.

Importantly, the model elements in the set 150A are transformed into a serialization 160A and both the presentation layer 170A and the serialization are assigned a version and inserted as an entry into a version table 190. Thereafter, as the data model 140A is modified into a modified data model 140B, a different presentation layer 170B is defined according to the data requirements 180B of the presentation layer 170B in respect to the data elements in a set of data elements 150B for the modified data model 140B. Again, the data elements in the set of data elements 150B may be serialized into a serialization 160B and assigned a version as can be the different presentation layer 170B, with both being included as part of an entry 100N in the version table 190.

Thus, as the data model 140A changes into modified data model 140B, if the prior presentation layer 170A is selected to visualize the modified data model 140B, the serialization 160B of the model elements in the set 150B is compared to the serialization 160A stored in the version table 190. If the serializations 160A, 160B match, it is determined that the presentation layer 170A is valid for visualizing the modified data model 140B. But, if the serializations 160A, 160B do not match, the presentation layer 170A is determined to be invalid and the prior data model 140 is the selected for providing the underlying data elements in the set of data elements 150A for the presentation layer in lieu of the modified data model 140B. In this way, it is assured that the selected presentation layer 170A can be validly presented despite underlying changes in the data model 140A present in the modified data model 140A that result in an invalid presentation layer 170A.

Figure 2:
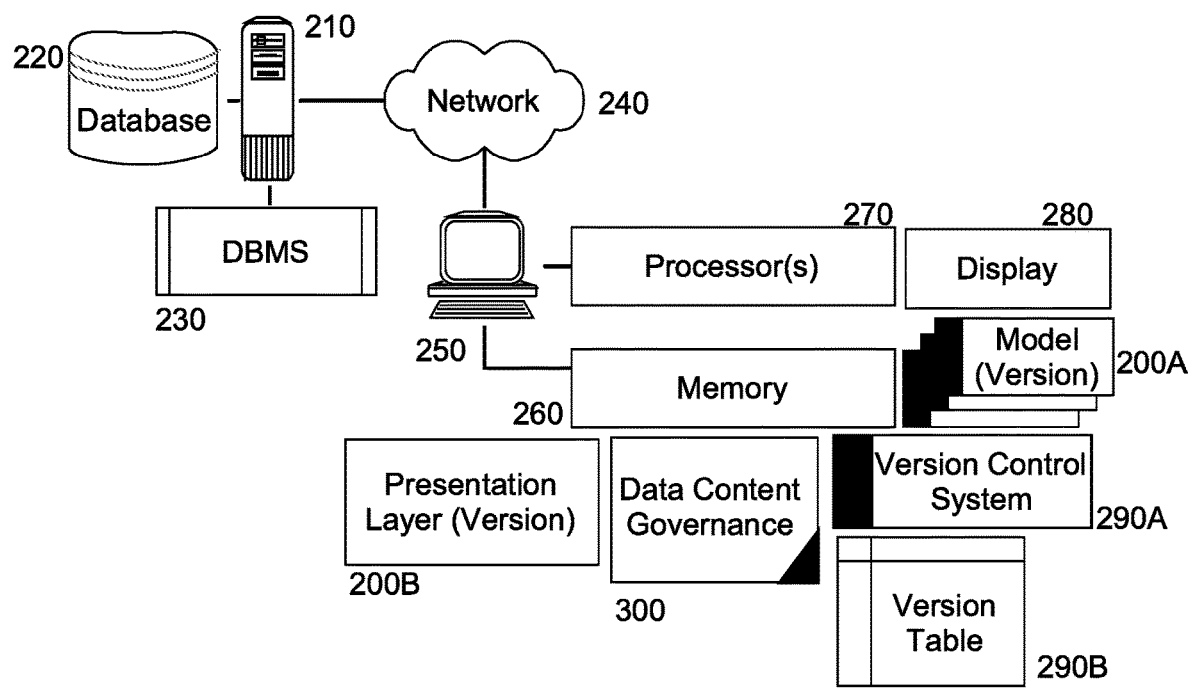
FIG. 2 is a schematic illustration of a data analytics data processing system adapted for data content governance for presentation layer synchronization; and, FIG. 3 is a flow chart illustrating a process for data content governance for presentation layer synchronization.

The process described in connection with FIG. 1 may be implemented in a data analytics data processing system. In further illustration, FIG. 2 schematically shows a data analytics data processing system adapted for data content governance for presentation layer synchronization. The system includes a host computing system 250 that includes one or more processors 270, memory 260 and a display 280. The host computing system 250 is coupled to a remote database server 210 supporting the execution of a DBMS 230 managing interactions with a database 220. The system also includes a data content governance module 300 including computer program instructions that execute in the memory 260 of the host computing system 250.

The program instructions of the data content governance module 300 upon execution in the memory 260 of the host computing system are operable to select an instance of a multiplicity of versioned data models 200A for the database 220 managed by version control system 290A, and also a presentation layer 200B adapted to visualize values in the database 220 associated with a set of data elements of the selected data model 200A. The program instructions further are enabled to serialize the data elements in the set and to assign a version to each of the serialization and the selected presentation layer 200B. The program instructions even further are enabled to add an entry to version table 290B of a version control system 290A including the versioned serialization and presentation layer.

The program instructions also are enabled upon execution in the memory 260 to respond to a selection of the presentation layer 200B associated with a specific version by locating in the version table 290B an entry including a correspondingly versioned serialization of data elements requisite for the validation of the selected presentation layer 200B. The program instructions then serialize the data elements of the selected instance of the data models 200A of a particular version presently loaded for visualization in the selected presentation layer 200B and compare the serialized data elements to the versioned serialization of data elements in the entry of the version table 290B. To the extent the serializations match, the selected presentation layer 200B may be rendered. But, to the extent that the serializations do not match, a prior instance of the data models 200A of the same version as the selected presentation layer 200B is retrieved for use in rendering the selected presentation layer 200B.

Figure 3:
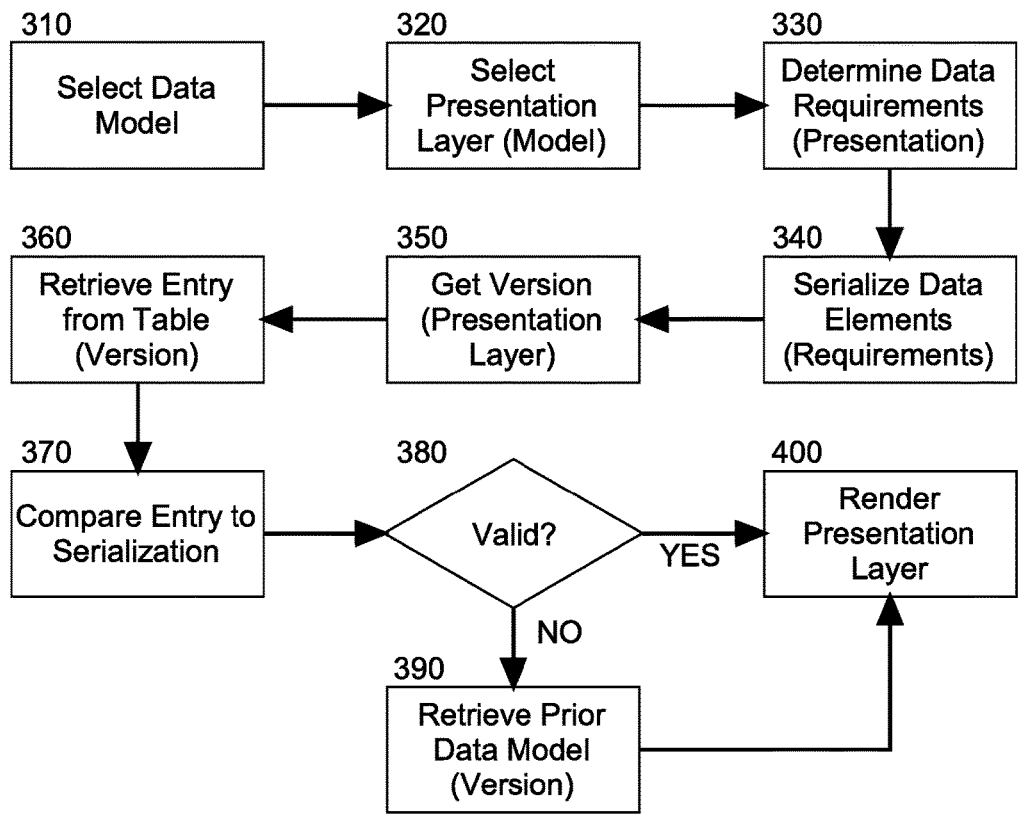

In even further illustration of the operation of the data content governance module 300, FIG. 3 is a flow chart illustrating a process for data content governance for presentation layer synchronization. Beginning in block 310, a versioned instance of a data model for an underlying database is selected in a version control system for use in visualizing values in the database modeled by the data model. In block 320, a presentation layer is selected in which the visualization may be rendered and in block 330, the data requirements for the presentation layer are determined. For instance, the data requirements include a data element associated with a user interface control in the presentation layer such that the data element must be accessible to the specified presentation layer in order to include in the user interface control a value of the database associated with the data element, or to compute a value for inclusion in the user interface control based upon a value of the database associated with the data element.

In block 340, those data elements in the versioned instance of the data model that are requisite to the visualization are serialized and in block 350, a version is retrieved for the selected presentation layer. Thereafter, in block 360 an entry is retrieved from a version table corresponding to the version and a serialization in the entry identified. In block 370, the identified serialization is compared to the serialization of the data elements in the versioned instance of the data model. In decision block 380, it is determined if the serializations match and are thus valid. If so, in block 400 the presentation layer may be rendered including the visualization. But otherwise, in block 390, a prior instance of the data model associated with the version of the presentation layer is retrieved and then, in block 400, the presentation layer may be rendered.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A data content governance for presentation layer synchronization method comprising:
defining an initial data model for underlying data values in a database;
generating a first presentation layer for the initial data model;
identifying a first set of elements of the initial data model necessary to meet data requirements of the first presentation layer;
serializing the first set of elements of the initial data model;
versioning the first presentation layer and the serialized first set of elements of the initial data model with respect to the first presentation layer; and
after versioning the first presentation layer and the serialized first set of elements of the initial data model:
receiving a request to update one of the data values in the database;
generating a modified data model comprising the updated one of the data values in the database;
generating a second presentation layer for the modified data model;
identifying a second set of elements of the modified data model necessary to meet data requirements of the second presentation layer;
serializing the second set of elements of the modified data model;
versioning the second presentation layer and the serialized second set of elements of the modified data model;
receiving a first selection to display the first presentation layer using the modified data model;
in response to receiving the first selection to display the first presentation layer using the modified data model, determining that the serialized first set of elements of the initial data model fails to match the serialized second set of elements of the modified data model; and
displaying the first presentation layer using the initial data model based on determining that the serialized first set of elements of the initial data model fails to match the serialized second set of elements of the modified data model.

2. The method of claim 1, further comprising:
receiving a second selection to display the first presentation layer using the modified data model;
in response to receiving the second selection to display the first presentation layer using the modified data model, determining that the serialized first set of elements of the initial data model matches the serialized second set of elements of the modified data model; and
displaying the first presentation layer using the modified data model based on determining that the serialized first set of elements of the initial data model matches the serialized second set of elements of the modified data model.

3. The method of claim 1, wherein the data requirements of the first presentation layer are user interface controls each referencing a particular element of the initial data model such that the particular element must be accessible to the first presentation layer in order to include data of the particular element in a corresponding one of the user interface controls of the first presentation layer.

4. The method of claim 1, wherein the data requirements of the first presentation layer are user interface controls each referencing content that is dependent upon a particular element of the initial data model such that the particular element must be accessible to the first presentation layer in order to compute data for the referenced content properly for inclusion in a corresponding one of the user interface controls of the first presentation layer.

5. A data visualization data processing system configured for data content governance for presentation layer synchronization, the system comprising:
a host computing system comprising one or more computers, each with memory and at least one processor;
a data visualization module comprising computer program instructions executing in the memory of the host computing system and accessing a data model in a database, the program instructions during execution performing:
defining an initial data model for underlying data values in the database;

generating a first presentation layer for the initial data model;
identifying a first set of elements of the initial data model necessary to meet data requirements of the first presentation layer;
serializing the first set of elements of the initial data model;
versioning the first presentation layer and the serialized first set of elements of the initial data model with respect to the first presentation layer; and
after versioning the first presentation layer and the serialized first set of elements of the initial data model:
  receiving a request to update one of the data values in the database;
  generating a modified data model comprising the updated one of the data values in the database;
  generating a second presentation layer for the modified data model;
  identifying a second set of elements of the modified data model necessary to meet data requirements of the second presentation layer;
  serializing the second set of elements of the modified data model;
  versioning the second presentation layer and the serialized second set of elements of the modified data model;
  receiving a first selection to display the first presentation layer using the modified data model;
  in response to receiving the first selection to display the first presentation layer using the modified data model, determining that the serialized first set of elements of the initial data model fails to match the serialized second set of elements of the modified data model; and
  displaying the first presentation layer using the initial data model based on determining that the serialized first set of elements of the initial data model fails to match the serialized second set of elements of the modified data model.

6. The system of claim 5, wherein the database is remotely disposed from the host computing system and accessible by the module from over a computer communications network.

7. The system of claim 5, wherein the program instructions are further enabled to perform:
receiving a second selection to display the first presentation layer using the modified data model;
in response to receiving the second selection to display the first presentation layer using the modified data model, determining that the serialized first set of elements of the initial data model matches the serialized second set of elements of the modified data model; and
displaying the first presentation layer using the modified data model based on determining that the serialized first set of elements of the initial data model matches the serialized second set of elements of the modified data model.

8. The system of claim 5, wherein the data requirements of the first presentation layer are user interface controls each referencing a particular element of the initial data model such that the particular element must be accessible to the first presentation layer in order to include data of the particular element in a corresponding one of the user interface controls of the first presentation layer.

9. The system of claim 5, wherein the data requirements of the first presentation layer are user interface controls each referencing content that is dependent upon particular element of the initial data model such that the particular element must be accessible to the first presentation layer in order to compute data for the referenced content properly for inclusion in a corresponding one of the user interface controls of the first presentation layer.

10. A computer program product for data content governance for presentation layer synchronization, the computer program product including a non-transitory computer readable storage medium having program instructions embodied therewith, the program instructions executable by a device to cause the device to perform a method including:
defining an initial data model for underlying data values in a database;
generating a first presentation layer for the initial data model;
identifying a first set of elements of the initial data model necessary to meet data requirements of the first presentation layer;
serializing the first set of elements of the initial data model;
versioning the first presentation layer and the serialized first set of elements of the initial data model with respect to the first presentation layer; and
after versioning the first presentation layer and the serialized first set of elements of the initial data model:
  receiving a request to update one of the data values in the database;
  generating a modified data model comprising the updated one of the data values in the database;
  generating a second presentation layer for the modified data model;
  identifying a second set of elements of the modified data model necessary to meet data requirements of the second presentation layer;
  serializing the second set of elements of the modified data model;
  versioning the second presentation layer and the serialized second set of elements of the modified data model;
  receiving a first selection to display the first presentation layer using the modified data model;
  in response to receiving the first selection to display the first presentation layer using the modified data model, determining that the serialized first set of elements of the initial data model fails to match the serialized second set of elements of the modified data model; and
  displaying the first presentation layer using the initial data model based on determining that the serialized first set of elements of the initial data model fails to match the serialized second set of elements of the modified data model.

11. The computer program product of claim 10, wherein the method further comprises:
receiving a second selection to display the first presentation layer using the modified data model;
in response to receiving the second selection to display the first presentation layer using the modified data model, determining that the serialized first set of elements of the initial data model matches the serialized second set of elements of the modified data model; and
displaying the first presentation layer using the modified data model based on determining that the serialized first set of elements of the initial data model matches the serialized second set of elements of the modified data model.

12. The computer program product of claim 10, wherein the data requirements of the first presentation layer are user interface controls each referencing a particular element of the initial data model such that the particular element must be accessible to the first presentation layer in order to include data of the particular element in a corresponding one of the user interface controls of the first presentation layer.

13. The computer program product of claim 10, wherein the data requirements of the first presentation layer are user interface controls each referencing content that is dependent upon particular element of the initial data model such that the particular element must be accessible to the first presentation layer in order to compute data for the referenced content properly for inclusion in a corresponding one of the user interface controls of the first presentation layer.

\* \* \* \* \*